United States Patent
Oi et al.

(10) Patent No.: US 11,312,247 B2
(45) Date of Patent: Apr. 26, 2022

(54) POWER SUPPLY DEVICE

(71) Applicant: DENSO CORPORATION, Kariya (JP)

(72) Inventors: Shohei Oi, Toyota (JP); Mamoru Tochitani, Toyota (JP)

(73) Assignee: DENSO CORPORATION, Kariya (JP)

( * ) Notice: Subject to any disclaimer, the term of this patent is extended or adjusted under 35 U.S.C. 154(b) by 278 days.

(21) Appl. No.: 16/784,870

(22) Filed: Feb. 7, 2020

(65) Prior Publication Data
US 2020/0269707 A1    Aug. 27, 2020

(30) Foreign Application Priority Data

Feb. 26, 2019    (JP) .............................. JP2019-032638

(51) Int. Cl.
*B60L 50/64*    (2019.01)

(52) U.S. Cl.
CPC ........... *B60L 50/64* (2019.02); *B60L 2210/14* (2013.01)

(58) Field of Classification Search
None
See application file for complete search history.

(56) References Cited

U.S. PATENT DOCUMENTS

| | | | |
|---|---|---|---|
| 9,733,287 B2* | 8/2017 | Goldsmith | G01R 21/133 |
| 2016/0261205 A1* | 9/2016 | Kolar | H02M 1/32 |
| 2017/0225636 A1* | 8/2017 | Tanigawa | H02M 3/155 |
| 2017/0256964 A1* | 9/2017 | Kim | H02J 7/00302 |

FOREIGN PATENT DOCUMENTS

JP    2018-191435 A    11/2018

* cited by examiner

*Primary Examiner* — Jared Fureman
*Assistant Examiner* — Joel Barnett
(74) *Attorney, Agent, or Firm* — Sughrue Mion, PLLC

(57) ABSTRACT

The power supply device includes a plurality of boost converters connected in parallel to boost and supply power from the power storage device, and a control device for controlling each of the boost converters. When the electronic control unit 50 cannot operate the plurality of boost converters by the feedback control, the control device operates only one of the plurality of boost converters by the feed forward control.

7 Claims, 2 Drawing Sheets

POWER SUPPLY DEVICE

CROSS-REFERENCE TO RELATED APPLICATIONS

The present disclosure claims priority to Japanese Patent Application No. 2019-032638 filed Feb. 26, 2019, which is incorporated herein by reference in its entirety including specification, drawings and claims.

TECHNICAL FIELD

The present disclosure relates to a power supply device, and more particularly, to a power supply device including a plurality of boost converters connected in parallel to boost and supply power from a power storage device.

BACKGROUND

Conventionally, as a power supply device of this type, there has been proposed the power supply device including a first boost converter and a second boost converter connected in parallel to boost and supply power from a battery (for example, see Patent Document 1). When the reduction amount of the load of the motor is larger than the predetermined value, a control device of the power supply device controls the first boost converter such that the reactor current of the first boost converter is smaller than the lower limit of the predetermined range including the value 0, and controls the second boost converter such that the power distribution amount of the second boost converter is maintained at the power distribution amount such that the reactor current of the second boost converter is higher than the upper limit of the predetermined range. Then, when the reactor current of the first boost converter becomes smaller than the lower limit during this control, the control device of the power supply device controls the second boost converter so that the power distribution amount of the second boost converter decreases. This suppresses the voltage fluctuation after boosting.

CITATION LIST

Patent Literature

PTL 1: JP2018-191435

SUMMARY

Generally, in the power supply device including a plurality of boost converters, each boost converter operates by feedback control. When the control device cannot operate each boost converter by feedback control due to some circumstances, it is conceivable that each boost converter is operated by feed forward control. In this case, the control device commands each boost converter to perform switching at the same timing, the actual switching timing is slightly deviated from the command if there is a variation in elements and performance unless the performance of each boost converter is completely the same. Such a shift in the switching timing causes a case in which a current circulates between the boost converters, thereby causing the element to generate heat or increase the loss.

A primary object of the power supply device of the present disclosure aims to cope with a case where a plurality of boost converters cannot be operated by feedback control.

In order to achieve the above primary object, the power supply device of the present disclosure employs the following configuration.

The power supply device of this aspect includes a plurality of boost converters connected in parallel configured to boost and supply power from a power storage device; a control device configured to control each boost converter, wherein the control device operates one boost converter of the plurality of boost converters by feed forward control in a specific abnormal state in which the control device cannot operate the plurality of boost converters by feedback control.

In the power supply device of the present disclosure, the control device operates only one boost converter of the plurality of boost converters by a feed forward control in a specific abnormal state in which the plurality of boost converters cannot be operated by the feedback control. That is, the other boost converters are not operated except for the boost converter which is operated by the feed forward control. This suppresses the circulation of the current between the boost converters, which may occur by operating the plurality of boost converters simultaneously by the feed forward control. That is, it is possible to cope with a case where a plurality of boost converters cannot be operated by feedback control.

DETAILED DESCRIPTION OF EMBODIMENTS

The following describes some aspects of the present disclosure with referring to embodiments.

Figure 1:
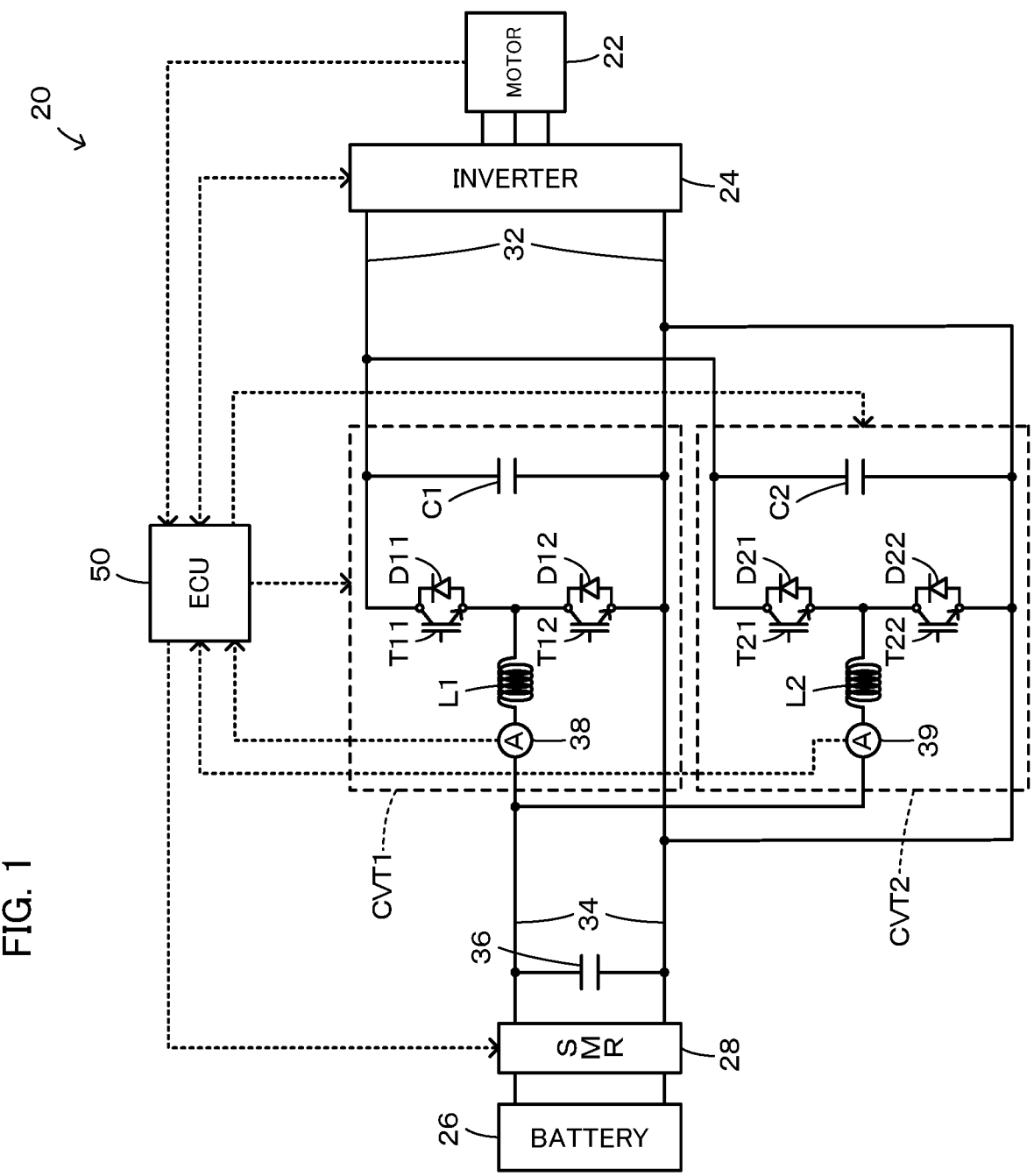
FIG. 1 is a configuration diagram illustrating the schematic electrical configuration of an electric vehicle 20 including a power supply device according to one embodiment of the present disclosure.

FIG. 1 is a configuration diagram illustrating the schematic electrical configuration of an electric vehicle 20 including a power supply device according to one embodiment of the present disclosure. As shown in FIG. 1, the electric vehicle 20 of the embodiment includes a motor 22, an inverter 24, a battery 26 as a power storage device, a first boost converter CVT1, a second boost converter CVT2, and an electronic control unit 50. The power supply device includes the battery 26, the first boost converter CVT1, and the second boost converter CVT2.

The motor 22 is configured as, for example, a synchronous motor generator. A rotor of the motor 22 is connected to a drive shaft connecting to drive wheels via a differential gear (not shown). The inverter 24 is connected to the motor 22 and to the high voltage power line 32. In the motor 22, the electronic control unit 50 controls a plurality of switching elements (not shown) of the inverter 24. This drives and rotates the motor 22.

The battery 26 is configured as, for example, a lithium ion rechargeable battery or a nickel hydride secondary battery. The battery 26 is connected with the low voltage side power lines 34. A system main relay 28 for connecting and disconnecting the battery 26 and a smoothing capacitor 36 are attached to the positive electrode side line and the negative electrode side line of the low voltage side power line 34 in this order from the battery 26 side.

The first boost converter CVT1 is connected to a high voltage side power line 32 and the low voltage side power line 34. The first boost converter CVT1 is configured as a well-known buck-boost converter having two transistors T11 and T12, two diodes D11 and D12, a reactor L1, and a capacitor C1. The transistor T11 is connected with the positive electrode line of the high voltage side power line 32. The transistor T12 is connected to the transistor T11 and the negative electrode side lines of the high voltage side power line 32 and the low voltage side power line 34. The reactor L1 is connected to a connection point between the transistors T11 and T12 and a positive electrode side line of the low voltage side power line 34. The capacitor C1 is connected to the positive electrode side line and the negative electrode side line of the high side power line 32. In the first boost converter CVT1, the electronic control unit 50 adjusts the ratio of the on-time of the transistors T11 and T12. As a result, the first boost converter CVT1 supplies the power of the low voltage side power line 34 to the high voltage side power line 32 with a voltage boost, and supplies the power of the high voltage side power line 32 to the low voltage side power line 34 with a voltage step-down.

The second boost converter CVT2 is connected in parallel with the first boost converter CVT1 as viewed from the battery 26. The second boost converter CVT2 is configured as a boost converter having substantially the same performance as the first boost converter CVT1, although variations in elements and manufacturers may differ. That is, the second boost converter CVT2 is connected to the high voltage side power line 32 and the low voltage side power line 34, similarly to the first boost converter CVT1. The second boost converter CVT2 is configured as a well-known buck-boost converter having two transistors T21 and T22, two diodes D21 and D22, a reactor L2, and a capacitor C2. In the second boost converter CVT2, the electronic control unit 50 adjusts the ratio of the on-time of the transistors T21 and T22. As a result, the second boost converter CVT2 supplies the power of the low voltage side power line 34 to the high voltage side power line 32 with a voltage boost, and supplies the power of the high voltage side power line 32 to the low voltage side power line 34 with a voltage step-down.

Although not shown, the electronic control unit 50 is configured as a CPU-based microprocessor. In addition to the CPU, the electronic control unit 50 includes a ROM configured to store processing programs, a RAM configured to temporarily store data, a non-volatile flash memory, and an input port and an output port.

As shown in FIG. 1, the electronic control unit 50 obtains signals input from various sensors via the input port. Examples of the signal input to the electronic control unit 50 are a rotational position $\theta m$ from a rotational position detection sensor (not shown) for detecting the rotational position of the rotor of the motor 22, and phase currents Iu and Iv from a current sensor (not shown) for detecting the current flowing in each phase of the motor 22. The signals input to the electronic control unit 50 further include a voltage between the terminals of the battery 26, a current Ib flowing through the battery 26, a temperature Tb of the battery 26, a voltage VH of the high voltage side power line 32, a voltage VL of the low voltage side power line 34, and the like. Further, the signals input to the electronic control unit 50 include a first reactor current IL1 from the current sensor 38 configured to detect a current flowing through the reactor L1 of the first boost converter CVT1, a second reactor current IL2 from the current sensor 39 configured to detect a current flowing through the reactor L2 of the second boost converter CVT2, and reactors temperature T1 and T2 from a temperature sensor (not shown) attached to the reactors L1 and L2. Further, although not shown, examples of signals input to the electronic control unit 50 include an ignition signal from an ignition switch, a shift position from a shift position sensor for detecting an operation position of a shift lever, an accelerator opening degree Acc from an accelerator pedal position sensor for detecting an amount of depression of an accelerator pedal, a brake pedal position from a brake pedal position sensor for detecting an amount of depression of a brake pedal, and a vehicle speed V from a vehicle speed sensor.

As shown in FIG. 1, various control signals are output from the electronic control unit 50 via the output port. Examples of the signal outputted from the electronic control unit 50 include a switching control signal to the plurality of switching elements of the inverter 24, a switching control signal to the transistors T11 and T12 of the first boost converter CVT1, a switching control signal to the transistors T21 and T22 of the second boost converter CVT2, and a drive control signal to the system main relay 28.

The electronic control unit 50 calculates the electric angle $\theta e$ and the rotational speed Nm of the motor 22 based on the rotational position $\theta m$ of the rotor of the motor 22. In addition, the electronic control unit 50 calculates the state of charge SOC of the battery 26 based on the accumulated value of the current Ib flowing through the battery 26, and calculates an input/output limits Win and Wout defined as the maximum allowable charging and discharging electric power to be charged in and discharged from the battery 26 based on the calculated state of charge SOC and the temperature Tb of the battery 26. Here, the state of charge SOC denotes a ratio of the capacity of electric power dischargeable from the battery 26 to the overall capacity of the battery 26.

In the electric vehicle 20 of the embodiment configured as described above, for example, the following may be used as the control for driving. The electronic control unit 50 of the electric vehicle 20 first sets a required torque Tp* required for driving (required for the drive shaft 26), based on the accelerator opening Acc and the vehicle speed V, and sets the torque command Tm* of the motor 22 to the required torque Tp*. Subsequently, the electronic control unit 50 performs switching control of the plurality of switching elements of the inverter 24 such that the motor 22 is driven by the torque command Tm*. With respect to the first boost converter CVT1 and the second boost converter CVT2, the electronic control unit 50 sets the target voltage VH* of the high voltage side power line 32 based on the torque command Tm* of the motor 22, and controls the voltage VH of the high voltage side power line 32 to be equal to the target voltage VH*.

As the control of the first boost converter CVT1 and the second boost converter CVT2, for example, the following may be used. First, the electronic control unit 50 sets the power distribution amount P1 of the first boost converter CVT1 and the power distribution amount P2 of the second boost converter CVT2 at predetermined distribution ratios of the power required for driving. Subsequently, the electronic control unit 50 performs feedback control on the first boost converter CVT1 based on the first reactor current IL1 detected by the current sensor 38 so that the first boost converter CVT1 outputs the power distribution amount P1. With respect to the second boost converter CVT2, the electronic control unit 50 performs feedback control based on the second reactor current IL2 detected by the current sensor 39 so as to output the power distribution amount P2.

Figure 2:
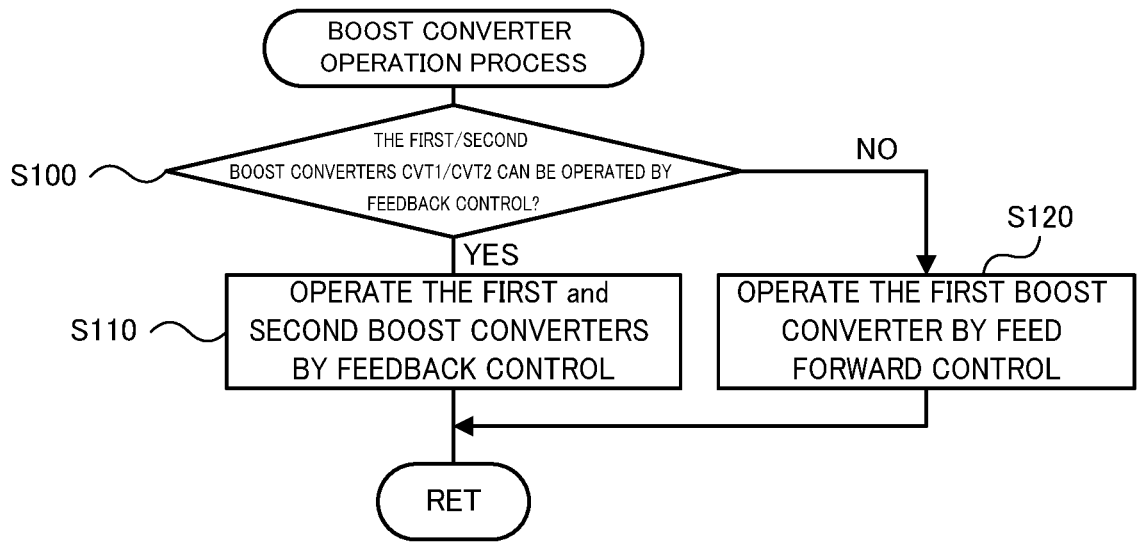
FIG. 2 is a flowchart showing an example of a boost converter operation process executed by the electronic control unit 50.

Next, the operation of the electric vehicle 20 of the embodiment configured as described above, in particular, the operation when the first boost converter CVT1 and the second boost converter CVT2 cannot be operated by feedback control will be described. FIG. 2 is a flowchart showing an example of the boost converter operation process performed by the electronic control unit 50.

When the boost converter operation process is performed, the electronic control unit 50 first determines whether or not the first boost converter CVT1 and the second boost converter CVT2 are in a state in which feedback control can be performed (step S100). As described above, the feedback control of the first boost converter CVT1 is performed based on the first reactor current IL1 detected by the current sensor 38. Therefore, it is determined that the first boost converter CVT1 cannot be operated by feedback control when an abnormality occurs in the current sensor 38 or when an abnormality such as disconnection occurs. Likewise, the electronic control unit 50 determines that the second boost converter CVT2 cannot be operated by feedback control when an abnormality occurs in the current sensor 39 or when an abnormality such as disconnection occurs.

When the electronic control unit 50 determines that the first boost converter CVT1 and the second boost converter CVT2 are in a state capable of feedback control at the step S100 as usual, the electronic control unit 50 operates the first boost converter CVT1 and the second boost converter CVT2 by feedback control, and terminates the present process.

When the electronic control unit 50 determines that one or both of the first boost converter CVT1 and the second boost converter CVT2 cannot be operated by feedback control in step S100, the electronic control unit 50 operates only the first boost converter CVT1 by feed forward control (step S120), and terminates the present process. That is, the electronic control unit 50 shuts down the second boost converter CVT2 (turns off the transistors T21 and T22), and operates only the first boost converter CVT1 by the feed forward control. The feed forward control, for example, may be a control to switch the transistors T11 and T12 of the first boost converter CVT1 based on a duty ratio obtained with respect to the power required for driving. The reason why only the first boost converter CVT1 is operated by the feed forward control in this manner is to prevent current from circulating between the first boost converter CVT1 and the second boost converter CVT2. when both the first boost converter CVT1 and the second boost converter CVT2 are operated by the feed forward control, the actual switching timing is slightly shifted even if the control device commands to switch at the same timing due to a slight difference in performance due to variations in elements and differences in manufacturers. Since only the first boost converter CVT1 is operated, the power that can be supplied by the first boost converter CVT1 is limited when the driver depresses the accelerator pedal to demand large power. However, this is a drive restriction in case of an abnormality, and there is no problem in the evacuation drive.

In the power supply device included in the electric vehicle 20 according to the embodiment described above, when the electronic control unit 50 determines that one or both of the first boost converter CVT1 and the second boost converter CVT2 cannot be operated by feedback control, the electronic control unit 50 operates the first boost converter CVT1 by the feed forward control. This suppresses inconvenience (circulation of current) caused by operating both the first boost converter CVT1 and the second boost converter CVT2 by the feed forward control.

In the power supply device included in the electric vehicle 20 of the embodiment, when the electronic control unit 50 determines that one or both of the first boost converter CVT1 and the second boost converter CVT2 cannot be operated by feedback control, the electronic control unit 50 only operates the first boost converter CVT1 by the feed forward control. However, the electronic control unit 50 may turn off the first boost converter CVT1 (shut down), and may only operate the second boost converter CVT2 by the feed forward control. Alternatively, the boost converter having a lower temperature among the temperatures T1 and T2 of the reactors L1 and L2 may be operated by the feed forward control.

In the power supply device included in the electric vehicle 20 of the embodiment, the power supply device includes two boost converters connected in parallel as the first boost converter CVT1 and the second boost converter CVT2, but may include three or more boost converters connected in parallel.

In the power supply device of the above aspect, the control device may control each boost converter based on a current flowing through each boost converter by feedback control, and the control device may determine that the specific abnormal state occurs when the current flowing through each boost converter cannot be detected.

In the power supply device of the above aspect, the control device may operate the one boost converter by duty control as the feed forward control In the power supply device of the above aspect, the boost converter operated by the feed forward control may be the boost converter having the lowest temperature among the plurality of boost converters. This suppresses overheating of the boost converter. Here, the temperature of the boost converter corresponds to the temperature of the reactor.

The following describes the correspondence relationship between the primary components of the embodiments and the primary components of the disclosure described in Summary. In the embodiment, the battery 26 corresponds to a "power storage device", the first boost converter CVT1 and the second boost converter CVT2 correspond to a "plurality of boost converters", and the electronic control unit 50 corresponds to a "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the power supply device and so on.

The invention claimed is:
1. A power supply device, comprising:
  a plurality of boost converters connected in parallel configured to boost and supply power from a power storage device;

a control device configured to control each boost converter, wherein the control device operates one boost converter of the plurality of boost converters by feed forward control in a specific abnormal state in which the control device cannot operate the plurality of boost converters by feedback control.

2. The power supply device according to claim 1, wherein the control device controls each boost converter based on a current flowing through each boost converter by feedback control, and the control device determines that the specific abnormal state occurs when the current flowing through each boost converter cannot be detected.

3. The power supply device according to claim 2, wherein the control device operates the one boost converter by duty control as the feed forward control.

4. The power supply device according to claim 2, wherein the boost converter operated by the feed forward control is the boost converter having the lowest temperature among the plurality of boost converters.

5. The power supply device according to claim 1, wherein the control device operates the one boost converter by duty control as the feed forward control.

6. The power supply device according to claim 5, wherein the boost converter operated by the feed forward control is the boost converter having the lowest temperature among the plurality of boost converters.

7. The power supply device according to claim 1, wherein the boost converter operated by the feed forward control is the boost converter having the lowest temperature among the plurality of boost converters.

\* \* \* \* \*